June 11, 1957 G. C. HENRY 2,795,044
SHEARS
Filed June 30, 1955 2 Sheets-Sheet 2
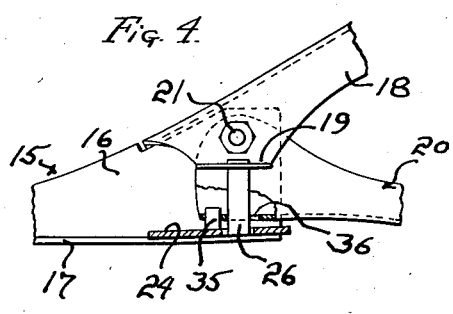
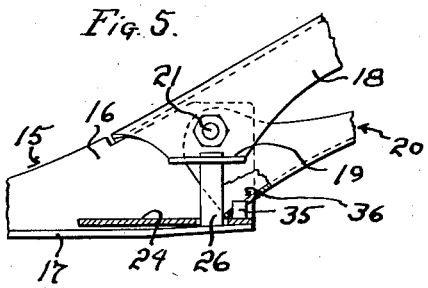
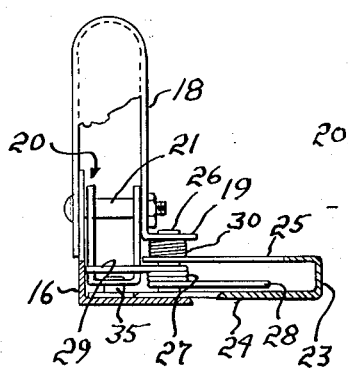
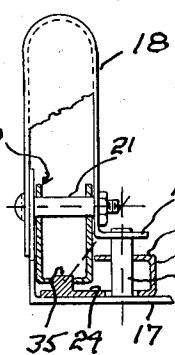
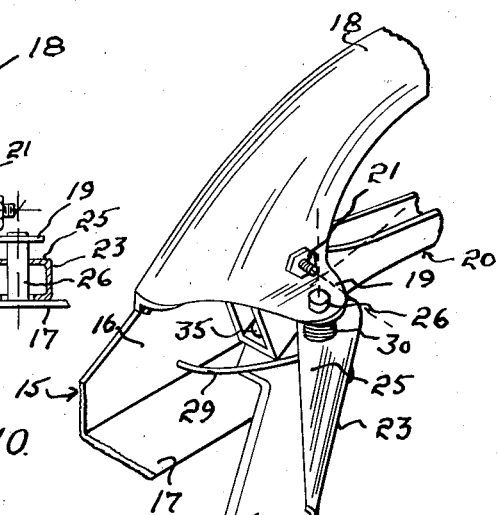
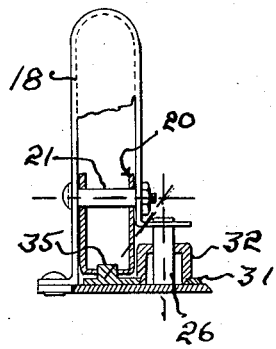
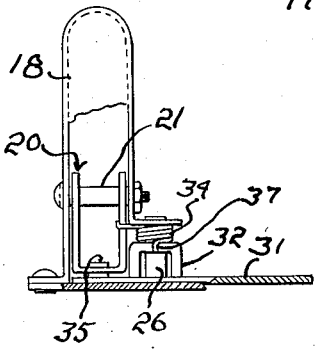
INVENTOR.
Glenn C. Henry
BY United States Patent Office 2,795,044
Patented June 11, 1957

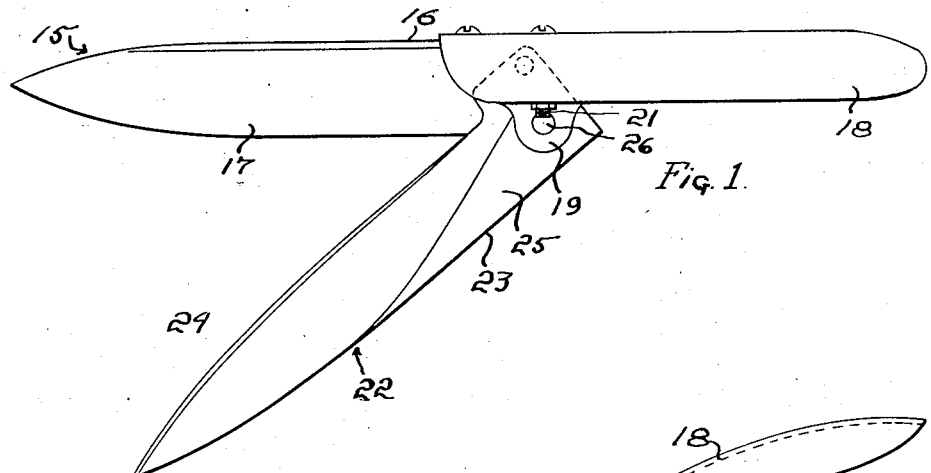
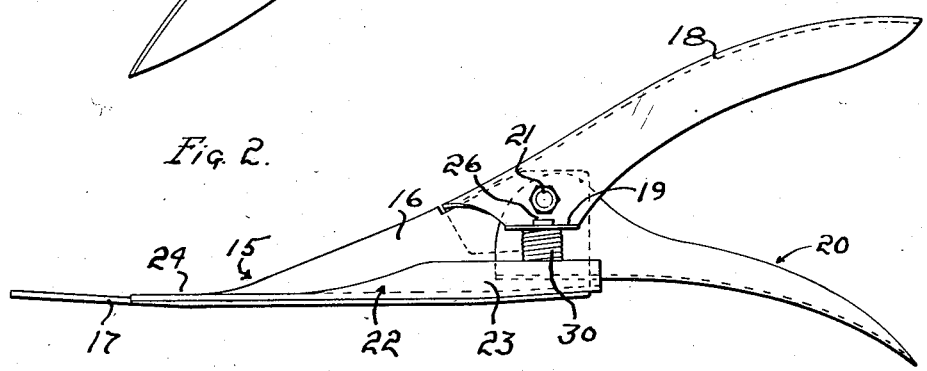
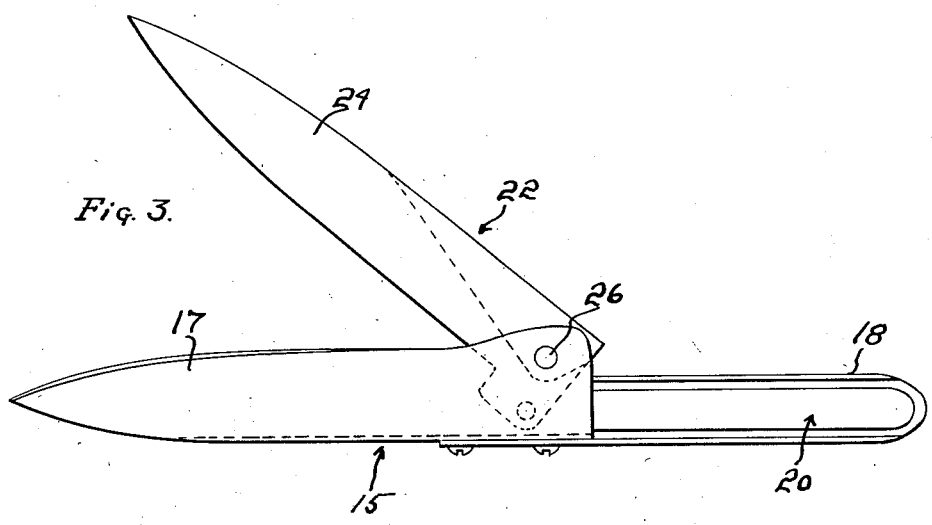

2,795,044
SHEARS
Glenn C. Henry, Otisfield, Maine
Application June 30, 1955, Serial No. 519,036
7 Claims. (Cl. 30—248)

The present invention relates to motion transmitting devices such, for example, as shears.

In my co-pending application, Serial No. 426,672, filed April 30, 1954, now Patent No. 2,712,179, dated July 5, 1955, there are described and claimed motion transmitting devices of the type in which three members are so connected that each pivots relative to both of the others with the pivot axes all intersecting at an approximately common point.

The present invention is concerned with means by which three members may be so joined with the pivoting of two of the members, the blades, for example, relative to each other occurring in spaced relation to their plane of coaction proximate to which is the pivotal connection between one of the blades and the third member, one of the handles, for example. The other handle and the other blade together constitute one member. This relationship of the pivots ensures that the cutting edges of the blade are urged into close and effective cutting relation on relative movement of one handle towards the other.

In the accompanying drawings, there are shown illustrative embodiments of the invention from which these and other of its objectives, novel features, and advantages will be readily apparent.

In the drawings:

Fig. 1 is a top plan view of shears in accordance with the invention.

Figs. 2 and 3 are, respectively, side and bottom views thereof.

Figs. 4 and 5 are fragmentary side views illustrating, respectively, the position of some of the parts when the shears are opened and closed.

Figs. 6 and 7 are similar fragmentary front views.

Fig. 8 is a fragmentary view, in perspective, illustrating the relationship of the axes, and Figs. 9 and 10 are views similar to Figs. 6 and 7, respectively, but illustrating another embodiment of the invention.

In accordance with the invention, the first member is generally indicated at 15 and is shown as including a part 16 of L-shaped section with one wall being integral with the first blade 17. A first handle 18 of U-shaped section is attached to the other wall of the part 16 and is provided with a shoulder 19 projecting parallel to but substantially above the plane of the blade 17. The second member, generally indicated at 20, is the second handle and it is shown as of U-shaped section and dimensioned so that its front end may fit within the corresponding part of the first handle 18 with the channels of the handles disposed towards each other. The handles are united at their front ends by the pivot 21.

The third member, generally indicated at 22, includes a U-shaped section 23 disposed with one of its walls forwardly extended and disposed as the second blade 24 and with its other wall 25 disposed below the shoulder 19. The pivot 26, extending between the shoulder 19 and the subjacent part of the first blade 17, passes freely through the blade forming wall of the section 23 and snugly fits a hole in the upper wall 25 thereof thus providing a pivotal connection between the blades spaced substantially from the plane of their coaction.

A spring 27, as may be seen in Fig. 6, coiled about the pivot 26 and housed within the section 23, has one end 28 bearing against the channel wall defined thereby and the other end 29 bearing against the wall of the member 15 carrying the pivot 21 thus to yieldably urge the blades 17 and 24 towards their open position.

There is also shown a compression spring 30 coiled about the pivot 26 between the shoulder 19 and the upper wall 25 of the section 23. In this connection, reference is made to the embodiment of the invention illustrated by Figs. 9 and 10 in which the second blade 31 is provided with a bridge 32 receiving the pivot 26 and to which is anchored one end 33 of the compression spring 34 coiled about the pivot 26 with its other end anchored to the handle member 20.

In both embodiments of the invention, the second blade has a stud 35 located between the pivot 26 and the handle carrying wall of the part 16 and entrant of a slot 36 in the channel bottom of the second handle member 20.

From the foregoing, it will be apparent that when the handles are brought together, the second handle exerts a rearward force against the stud 35 swinging the second blade 24 towards the first blade 17. It will also be apparent that the stud and slot connection is a pivotal connection between the second blade and the second handle and that the three pivot axes all intersect approximately at a common point but with the pivot 35 acting at a point more distant from the intersection of the pivot axes than the pivot 26 as will be apparent from Figs. 7 and 9. As shown in Figs. 7, 8 and 9, the pivot between the second blade and the second handle is, for convenience in manufacture, perpendicular to the plane of the blades. The actual motion of the points of contact of the pivot is arcuate with respect to a center located at the point of intersection of the other two axes. For that reason, the radius of that arc may be termed "the axis of motion."

What I therefore claim and desire to secure by Letters Patent is:

1. In shears, a pair of pivotally joined handles, a pair of blades pivotally joined at a substantial distance from the cutting plane of the blades, one blade and one handle being rigidly joined together, the other blade and handle being pivotally joined at a point close to the cutting plane of the blades.

2. In shears, a blade and handle member, a second handle, a second blade coacting with the blade section of the first member and being pivoted thereto and to said second handle, the pivot between the second handle and second blade being considerably closer to the plane of cutting action than the pivot between the blades thereby forcing the blades into closer contact during cutting action.

3. In shears, a blade and handle member, a second blade and a second handle pivoted thereto and to each other, the pivot between the blades acting at a point substantially separated from the plane of cutting action of the blades and the pivot between the second blade and second handle being situated on the cutting edge side of said second blade and close to the cutting plane of the blades and the second handle being pivoted on the first handle so as to exert a rearward force against said second blade.

4. In shears, a blade and handle member, a second blade and a second handle pivoted directly thereto and to each other, the pivot between the second blade and the second handle being located and arranged to exert a rearward force against said second blade as said second handle is swung toward the handle member and being so spaced relative to the pivot between the blades to cause said rearward force to swing the second blade towards the first blade and into closer cutting contact therewith.

5. In shears, a pair of handles and a pair of blades, one blade including an L-shaped section rigidly attached to one handle on one side of the L-shaped section, a pivot connecting the last named side to the second handle, the second blade including a U-shaped section and a blade on one side of said section, a second pivot joining the other side of the U-shaped section and said other blade, a third pivot joining the second handle and the blade of said U-shaped section, and spring means carried by said second pivot yieldably swinging said blades apart and maintaining them in mutual contact.

6. In shears, a first member comprising a handle, a shear blade, and an intermediate shoulder overlying a part of said blade, a second handle member pivotally connected to said first member and a second blade including a shoulder overlying a part thereof, pivot means joining said blades and extending through their shoulders, and a pivotal connection between said handle and said second blade.

7. In shears, a first member comprising a handle, a shear blade, and an intermediate shoulder overlying a part of said blade, a second handle member pivotally connected to said first member and a second blade including a shoulder overlying a part thereof but spaced vertically from the first named shoulder, pivot means joining said blades and extending through their shoulders, a pivotal connection between said handle and said second blade, and a compression spring between said shoulder.

References Cited in the file of this patent

UNITED STATES PATENTS

| 1,562,630 | Ginnel | Nov. 24, 1925 |
| 2,136,414 | Clements | Nov. 15, 1938 |
| 2,281,977 | Keiser | May 5, 1942 |
| 2,407,237 | Keiser | Sept. 10, 1946 |
| 2,712,179 | Henry | July 5, 1955 |